(12) United States Patent
Ito

(10) Patent No.: US 10,293,642 B2
(45) Date of Patent: *May 21, 2019

(54) PNEUMATIC TIRE

(71) Applicant: Sumitomo Rubber Industries, Ltd., Kobe-shi, Hyogo (JP)

(72) Inventor: Kae Ito, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 238 days.

This patent is subject to a terminal disclaimer.

(21) Appl. No.: 15/292,411

(22) Filed: Oct. 13, 2016

(65) Prior Publication Data

US 2017/0106701 A1    Apr. 20, 2017

(30) Foreign Application Priority Data

Oct. 14, 2015    (JP) .................................. 2015-203075

(51) Int. Cl.
*B60C 11/12*    (2006.01)
*B60C 11/11*    (2006.01)
*B60C 11/03*    (2006.01)

(52) U.S. Cl.
CPC ...... *B60C 11/1236* (2013.01); *B60C 11/0304* (2013.01); *B60C 11/0306* (2013.01);
(Continued)

(58) Field of Classification Search
CPC ............. B60C 11/1204; B60C 11/1236; B60C 11/1259; B60C 11/0304; B60C 11/0306;
(Continued)

(56) References Cited

U.S. PATENT DOCUMENTS

2006/0254684 A1*  11/2006  Tamura ............... B60C 11/0306
                                                         152/209.18
2012/0305155 A1   12/2012  Hamanaka
(Continued)

FOREIGN PATENT DOCUMENTS

JP           5-330319 A     12/1993
JP         2015-30415 A      2/2015
WO    WO2015-002154    *    1/2015    ............. B60C 11/04

OTHER PUBLICATIONS

Machine translation of JP05-330319 (no date).*
Extended European Search Report for European Application No. 16191244.9, dated Mar. 2, 2017.

*Primary Examiner* — Justin R Fischer
*Assistant Examiner* — Philip N Schwartz
(74) *Attorney, Agent, or Firm* — Birch, Stewart, Kolasch & Birch LLP

(57)  ABSTRACT

A pneumatic tire comprises a tread portion provided with blocks divided by main grooves extending continuously in the tire circumferential direction, and axial grooves connecting between the main grooves. The blocks include a siped block. The siped block is provided with a first sipe extending in the tire axial direction across the block, and second sipes respectively disposed in regions subdivided by the first sipe. Each of the second sipes is a closed sipe whose both ends are closed, and the maximum depth of the second sipe is less than the maximum depth of the first sipe.

11 Claims, 6 Drawing Sheets

(52) U.S. Cl.
CPC .......... *B60C 11/11* (2013.01); *B60C 11/1204* (2013.01); *B60C 11/1259* (2013.01); *B60C 2011/0341* (2013.01); *B60C 2011/0346* (2013.01); *B60C 2011/0358* (2013.01); *B60C 2011/0362* (2013.01); *B60C 2011/0367* (2013.01); *B60C 2011/1213* (2013.01); *B60C 2011/1227* (2013.01); *B60C 2011/1254* (2013.01); *B60C 2011/1268* (2013.01)

(58) Field of Classification Search
CPC ..... B60C 2011/0358; B60C 2011/0367; B60C 2011/0331; B60C 2011/1213; B60C 2011/1268; B60C 2200/06; B60C 2200/065
See application file for complete search history.

(56) References Cited

U.S. PATENT DOCUMENTS

| | | | |
|---|---|---|---|
| 2013/0098519 A1* | 4/2013 | Maehara | B60C 11/0306 |
| | | | 152/209.22 |
| 2013/0139937 A1 | 6/2013 | Gayton et al. | |
| 2013/0186533 A1* | 7/2013 | Kaneko | B60C 11/032 |
| | | | 152/209.17 |
| 2016/0152087 A1* | 6/2016 | Hayashi | B60C 11/1392 |
| | | | 152/209.18 |
| 2016/0185159 A1* | 6/2016 | Ookawa | B60C 11/04 |
| | | | 152/209.18 |

* cited by examiner

PNEUMATIC TIRE

TECHNICAL FIELD

The present invention relates to a pneumatic tire whose blocks disposed in the tread portion are improved in the uneven wear resistance.

BACKGROUND ART

For example, the following patent document 1 discloses a pneumatic tire provided with a plurality of blocks having a hexagonal tread, and the blocks are provided with sipes extending across the blocks' treads in the tire axial direction in order to mitigate the deformation of the tread when contacting with the ground.

However, such sipes are insufficient for fully mitigating the deformation of the tread when contacting with the ground, and there is a tendency that uneven wear occurs among the regions of the blocks' treads subdivided by the sipes. Therefore, in the pneumatic tire of the patent document 1, there is room for further improvement in the uneven wear resistance of the blocks.

Patent document 1: Japanese Patent Application Publication No. 2015-30415

SUMMARY OF THE INVENTION

Problems to Be Solved By the Invention

It is therefore, an object of the present invention to provide a pneumatic tire in which blocks are improved in the uneven wear resistance.

Means of Solving the Problems

According to the present invention, a pneumatic tire comprises
a tread portion provided with a plurality of blocks divided by a plurality of main grooves extending continuously in the tire circumferential direction, and a plurality of axial grooves connecting between the main grooves, wherein
the blocks include a siped block,
the siped block is provided with a first sipe extending in the tire axial direction across the block, and second sipes respectively disposed in regions subdivided by the first sipe,
each of the second sipes is a closed sipe whose both ends are closed, and
the maximum depth of the second sipe is less than the maximum depth of the first sipe.

In the pneumatic tire according to the present invention, it is preferable that
the maximum depth of the first sipe is in a range of from 0.50 to 0.90 times the maximum depth of the main groove, and
the maximum depth of the second sipe is in a range of from 0.20 to 0.50 times the maximum depth of the main groove.

In the pneumatic tire according to the present invention, it is preferable that
the first sipe comprises a first portion including one end in the tire axial direction, a second portion including the other end in the tire axial direction, and a third portion between the first portion and the second portion,
each of the first portion and the second portion has a wavy configuration extending in the tire axial direction while oscillating in the tire circumferential direction,
the first portion and the second portion are shifted from each other in the tire circumferential direction, and
the third portion extends straight while inclining with respect to the tire axial direction.

In the pneumatic tire according to the present invention, it is preferable that
the axial length of the third portion is less than the axial length of the second sipe.

In the pneumatic tire according to the present invention, it is preferable that
the siped block has a first block side wall and a second block side wall respectively extending along the main grooves on both sides thereof,
in the top view of the siped block, the first block side wall and the second block side wall are substantially v-shaped to have a vertex protruding outwardly of the block, and
one end of the first sipe is positioned on one side in the tire circumferential direction of the vertex of the first block side wall, whereas the other end of the first sipe is positioned on the other side in the tire circumferential direction of the vertex of the second block side wall.

In the pneumatic tire according to the present invention, it is preferable that
the distance in the tire circumferential direction from the vertex of the first block side wall to the above-mentioned one end of the first sipe is in a range of from 0.05 to 0.20 times the distance in the tire circumferential direction from the vertex of the first block side wall to an end of the first block side wall on the above-mentioned one side in the tire circumferential direction.

In the pneumatic tire according to the present invention, it is preferable that
the main grooves include a pair of crown main grooves disposed one on each side of the tire equator, and a pair of shoulder main grooves disposed axially outside the crown main grooves,
the axial grooves include center axial grooves connecting between a pair of the crown main grooves, middle axial grooves connecting between the crown main grooves and the shoulder main grooves, and shoulder axial grooves extending from the shoulder main grooves to the tire tread edges,
the center axial grooves and the shoulder axial grooves extend straight in parallel with the tire axial direction, and
the middle axial grooves incline with respect to the tire axial direction and each have a bent part.

In the pneumatic tire according to the present invention, it is preferable that
the depth of the shoulder axial groove is in a range of from 0.05 to 0.25 times the depth of the shoulder main groove.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), MAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The term "sipe" means a very narrow groove having a width in a range of from 0.5 to 1.5 mm and thus distinguished from grooves serving for drainage.

DESCRIPTION OF THE PREFERRED EMBODIMENTS

The present invention can be applied to various kinds of pneumatic tires, but suitably applied to heavy duty tires such as truck/bus tires. Thus, in conjunction with the accompanying drawings, an embodiment of the present invention will now be described in detail, taking a heavy duty as an example. As well known in the art, a heavy duty pneumatic tire comprises a tread portion whose outer surface defines the tire tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

Figure 1:
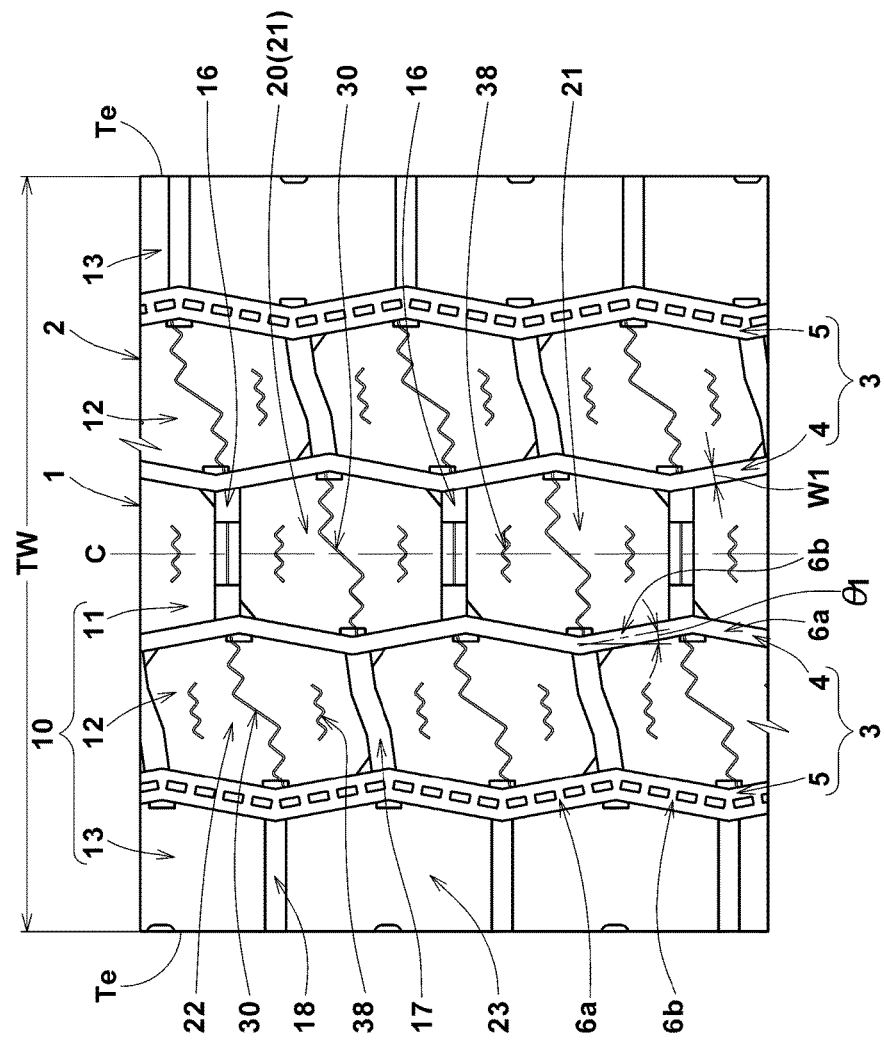
FIG. 1 is a developed plan view showing the tread portion of a pneumatic tire as an embodiment of the present invention.

FIG. 1 shows the tread portion 2 of the tire 1 as an embodiment.

As shown in FIG. 1 the tread portion 2 is provided with land regions 10 axially divided by main grooves 3 extending continuously in the tire circumferential direction.

The main grooves 3 in this example include a pair of axially outermost shoulder main grooves 5, and a pair of axially inner crown main grooves 4 disposed one on each side of the tire equator.

Each of the main grooves 3 in this example is a zigzag groove made up of alternately circumferentially arranged first oblique segments 6a and second oblique, segments 6b. The first oblique segments 6a and the second oblique segments 6b are inclined with respect to the tire circumferential direction to the opposite axial directions.

In each of the main grooves 3 in this example, the first oblique segments 6a and the second oblique segments 6b have an identical circumferential length.

The angles θ1 of the oblique segments 6a and 6b with respect to the tire circumferential direction are, for example, set in a range of from 5 to 15 degrees.

But, the main groove 3 is not limited to a zigzag groove. The main groove 3 may be a straight groove.

It is preferable that each of the main grooves 3 has a groove width w1 in a range of from 1.5% to 5.0% of the tread width TW. In the case of the heavy duty pneumatic tires, it is preferable that each of the main grooves 3 has a groove depth of from 20 to 30 mm. Such main grooves 3 help to improve the wet performance and uneven wear resistance in good balance.

The land regions 10 in this example are a center land region 11 between the crown main grooves 4, two middle land regions 12 between the crown main grooves 4 and the shoulder main grooves 5, and two axially outermost shoulder land regions 13 axially outside the shoulder main grooves 5.

Each of the land regions 10 is a row of circumferentially arraigned blocks 20 divided by axial grooves.

Figure 2:
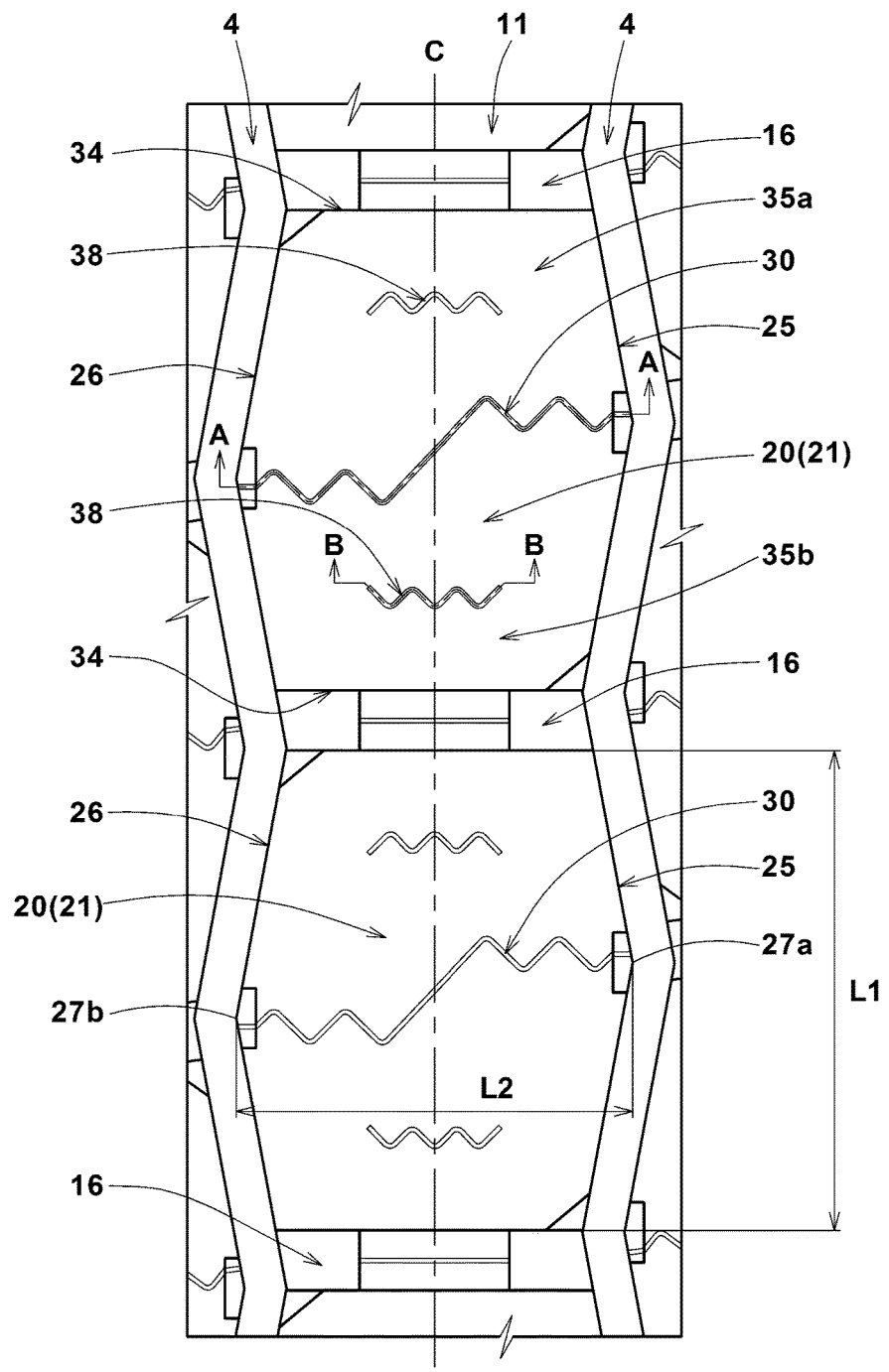
FIG. 2 is a closeup showing the center land region in FIG. 1.

As shown in FIG. 2, the center land region 11 is a row of circumferentially arranged center blocks 21 divided by the center axial grooves 16 extending straight in parallel with the tire axial direction between the crown main grooves 4.

The block 20 has a first block side wall 25 and a second block side wall 26 respectively extending along the main grooves on both sides thereof in the tire axial direction, and a pair of opposite third block side walls 34 respective extending along the axial grooves on both sides thereof in the tire circumferential direction.

The first block side wall 25 and the second block side wall 26 each have a substantially v-shaped configuration in the top view of the block to have a vertex 27a, 27b most protruding outwardly of the block.

The third block side walls 34 in this example each have a straight configuration in the top view of the block. Thereby, the block 20 has a hexagonal tread. Each of the block 20 in this example is a circumferentially long block in which the maximum length L1 in the tire circumferential direction is more than the maximum length L2 in the tire axial direction. Such block 20 helps to reduction the rolling resistance as the rigidity in the tire circumferential direction is relatively high.

The blocks 20 include siped blocks 20 each provided with a first sipe 30 extending in the tire axial direction from the first block side wall 25 to the second block side wall 26 to cross the entire width of the block.

The siped block 20 is subdivided by the first sipe 30 into two regions 35a and 35b. Each of the regions 35a and 35b is further provided with a second sipe 38.

The second sipe 38 is a closed sipe whose both ends are closed within the region 35a, 35b.

Figure 3A:
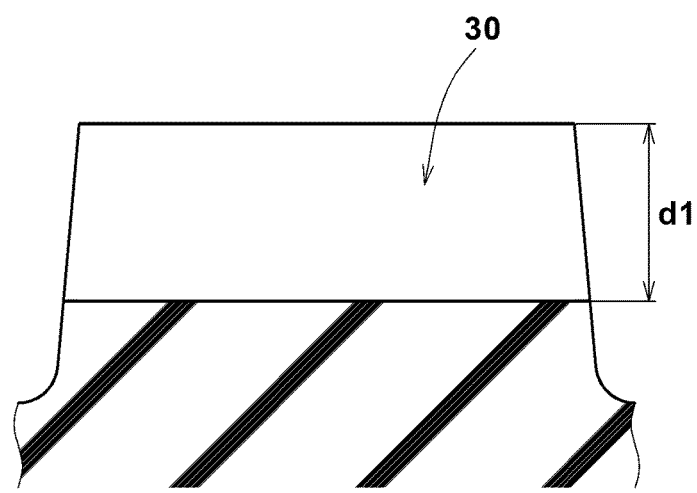
FIG. 3(a) is a cross sectional view of the first sipe taken along line A-A in FIG. 2.
Figure 3B:
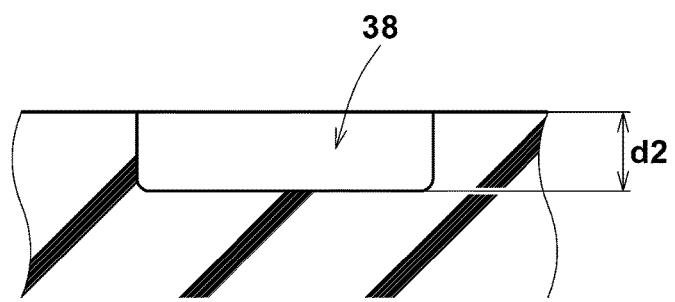
FIG. 3(b) is a cross sectional view of the second sipe taken along line B-B in FIG. 2.

The maximum depth d2 of the second sipe 38 (shown in FIG. 3(b)) is less than the maximum depth d1 of the first sipe 30 (shown in FIG. 3(a)).

Such first sipe 30 and the second sipe 38 can reduce the deformation of the tread of the siped block 20 when contacting with the ground, and the uneven wear of the block tread can be prevented.

Further, since the second sipe 38 is a closed sipe whose maximum depth is smaller than that of the first sipe 30, the rigidity of the regions subdivided by the first sipe 30 is maintained, therefore, the regions wear evenly, without sacrificing the steering stability.

In order to effectively derive this advantage, the ratio d2/d1 of the maximum depth d2 of the second sipe 38 to the maximum depth d1 of the first sipe 30 is preferably not less than 0.30, more preferably not less than 0.35, and preferably not more than 0.50, more preferably not more than 0.45.

Preferably, the maximum depth d1 of the first sipe 30 is 0.50 to 0.90 times the maximum depth d3 of the main groove 3.

Preferably, the maximum depth d2 of the second sipe 38 is 0.20 to 0.50 times the maximum depth d3 of the main groove 3. Such first sipe 30 and the second sipe 38 help to improve the wet performance and the steering stability in good balance.

Figure 4:
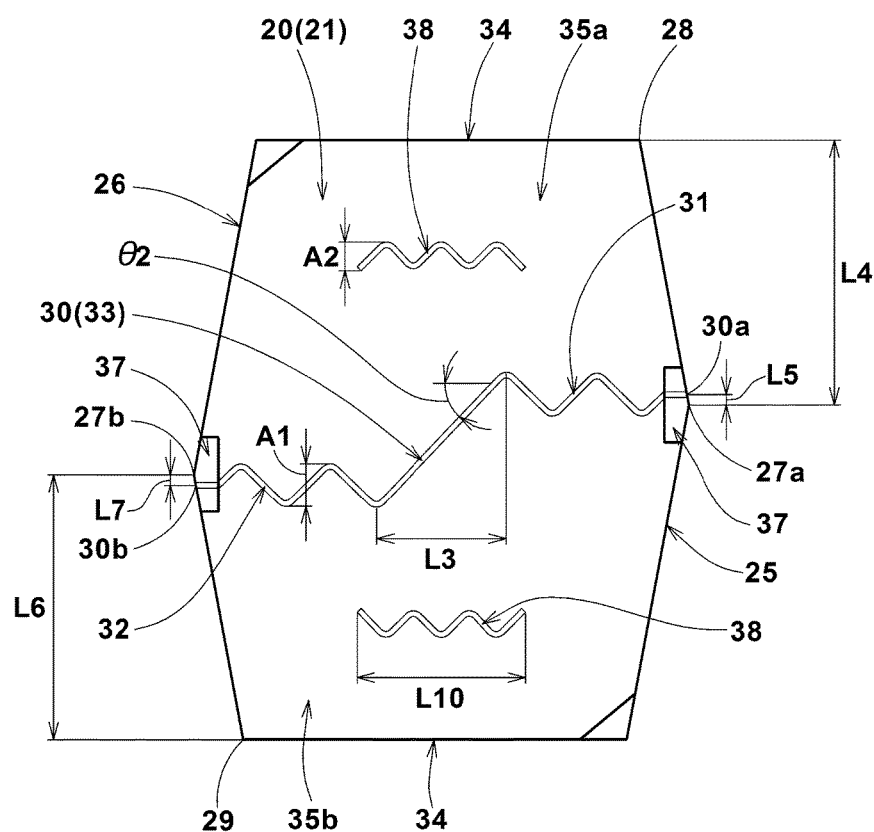
FIG. 4 is a closeup showing the center block in FIG. 2.

As shown in FIG. 4, it is preferable that the second sipe 38 in this example has a wavy configuration extending in the tire axial direction while oscillating in the tire circumferential direction.

Since the opposite walls of the second sipe 38 can engage with each other, the second sipe 38 can maintain the rigidity of the siped block 20, and consequently, the uneven wear resistance of the blocks can be improved.

In order to effectively derive this advantages effect, the peak-to-peak amplitude A2 in the tire circumferential direction of the second sipe 38 is preferably a set in a range of from 0.03 to 0.15 times the maximum length L1 in the tire circumferential direction of the block 20.

The axial length L10 of the second sipe 38 in this example is 0.30 to 0.40 times the maximum axial length L2 of the block 20. Such second sipe 38 can be improve the uneven wear resistance of the blocks, while controlling the increase in the rolling resistance.

The first sipe 30 in this example is composed of a first portion 31 including one end 30a in the tire axial direction, a second portion 32 including the other end 30b in the tire axial direction, and a third portion 33 between the first portion 31 and the second portion 32.

It is preferable that the first portion 31 and the second portion 32 each have a wavy configuration extending in the tire axial direction while oscillating in the tire circumferential direction, the first portion 31 extends in the tire axial direction with a constant amplitude, and the second portion 32 extends in the tire axial direction with a constant amplitude. Such first portion 31 and second portion 32 can maintain the rigidity of the block as the opposite walls of the sipe can engage with each other in order to improve the uneven wear resistance of the block.

The wavy configuration of each of the first and second portions 31 and 32 in this embodiment is a zigzag, of about 1.75 cycles when counted form the end of the straight third portion 33.

The peak-to-peak amplitude A1 in the tire. Circumferential direction of each of the first portion 31 and the second portion 32 in this example is preferably more than the amplitude A2 of the second sipe 38.

More specifically, the peak-to-peak amplitude A1 of each of the first portion 31 and the second portion 32 is preferably not less than 1.30 times, more preferably not less than 1.35 times, and preferably not more than 1.50 times, more preferably not more than 1.45 times the amplitude A2 of the second sipe 38. Thereby, when the siped block 20 contacts with the ground and the opposite walls of each sipe contact with each other, the rigidity in the tire axial direction of the central portion of the block 20 becomes relatively high. Therefore, uneven wear in the vicinities of the vertices 27a and 27b of the first block side wall 25 and the second block side wall 26 can be reduced.

It is preferable that the first portion 31 and the second portion 32 are shifted from each other in the tire circumferential direction. Such first portion 31 and second portion 32 mitigate the rigidity in the tire circumferential direction of the regions 35a and 35b subdivided by the first sipe 30, and as a result, impact on the heel-side edge and toe-side edge of the block 20 can be reduced. Accordingly, the heel and toe wear of the block 20 can be effectively controlled.

Preferably, the axial length of the first portion 31 is set to be equal to the axial length of the second portion 32. Thereby, wear of the block 20 becomes evened, and the uneven wear resistance can be further improved.

The third portion 33 in this example extends straight, while inclining with respect to the tire axial direction. The angle θ2 of the third portion 33 with respect to the tire axial direction is, for example, set in a range of from 40 to 60 degrees. Such third portion 33 can effectively mitigate the deformation of the tread when contacting with the ground.

The axial length L3 of the third portion 33 in this example is preferably less than the axial length L10 of the second sipe 38. More specifically, the length L3 of the third portion 33 is preferably not less than 0.70 times, more preferably not less than 0.75 times, and preferably not more than 0.85 times, more preferably not more than 0.80 times the axial length L10 of the second sipe 38. Such third portion 33 increases the rigidity of the central portion of the block, and helps to control the increase in the rolling resistance.

In the first sipe 30 in this example, the above-mentioned one end 30a is positioned on one side in the tire circumferential direction (upper side in FIG. 4) of the vertex 27a of the first block side wall 25, whereas the other end 30b is positioned on the other side in the tire circumferential direction (under side in FIG. 4) of the vertex 27b of the second block side wall 26.

Since such one end 30a and the other end 30b of the first sipe 30 are disposed off the vertices 27a and 27b of the block side walls 25 and 26 where large stress is liable to concentrate, uneven wear in the vicinity of the vertex of the block side wall can be prevented.

Further, since the regions 35a and 35b subdivided by the first sipe 30 each include one vertex of the block side wall, the rigidity of such regions are increased in good balance, and even wear is possible.

If the distance between the end of the first sipe 30 and the vertex of the block side wall is small, there is a possibility that uneven wear occurs in the vicinity of the vertex. If the above-mentioned distance is large, the distance between the first sipe 30 and the third block side wall 34 becomes small, and there is a possibility that the rigidity of the block is decreased.

Therefore, the distance L5 in the tire circumferential direction from the vertex 27a of the first block side wall 25 to the above-mentioned one end 30a of the first sipe 30 is preferably not less than 0.05 times, more preferably not less than 0.10 times, and preferably not more than 0.30 times, more preferably not more than 0.20 times the distance L4 in the tire circumferential direction from the vertex 27a of the first block side wall 25 to the end 28 of the first block side wall 25 on one side in the tire circumferential direction.

From a similar standpoint, the distance L7 in the tire circumferential direction from the vertex 27b of the second block side wall 26 to the other end 30b of the first sipe 30 is preferably not less than 0.05 times, more preferably not less than 0.10 times, and preferably not more than 0.30 times, more preferably not more than 0.20 times the distance L6 in the tire circumferential direction from the vertex 27b of the second block side wall 26 to the end of the second block side wall 26 on the other side in the tire circumferential direction.

More preferably, one end 30a and the other end 30b of the first sipe 30 are respectively connected to slits 37 of the block side walls 25 and 26. The slit 37 is a sloping surface which is a part of the block side wall (25, 26) whose angle with respect to a tire radial direction is larger than those on both sides thereof. Thereby, uneven wear starting from the ends of the first sipe 30 can be prevented.

Figure 5:
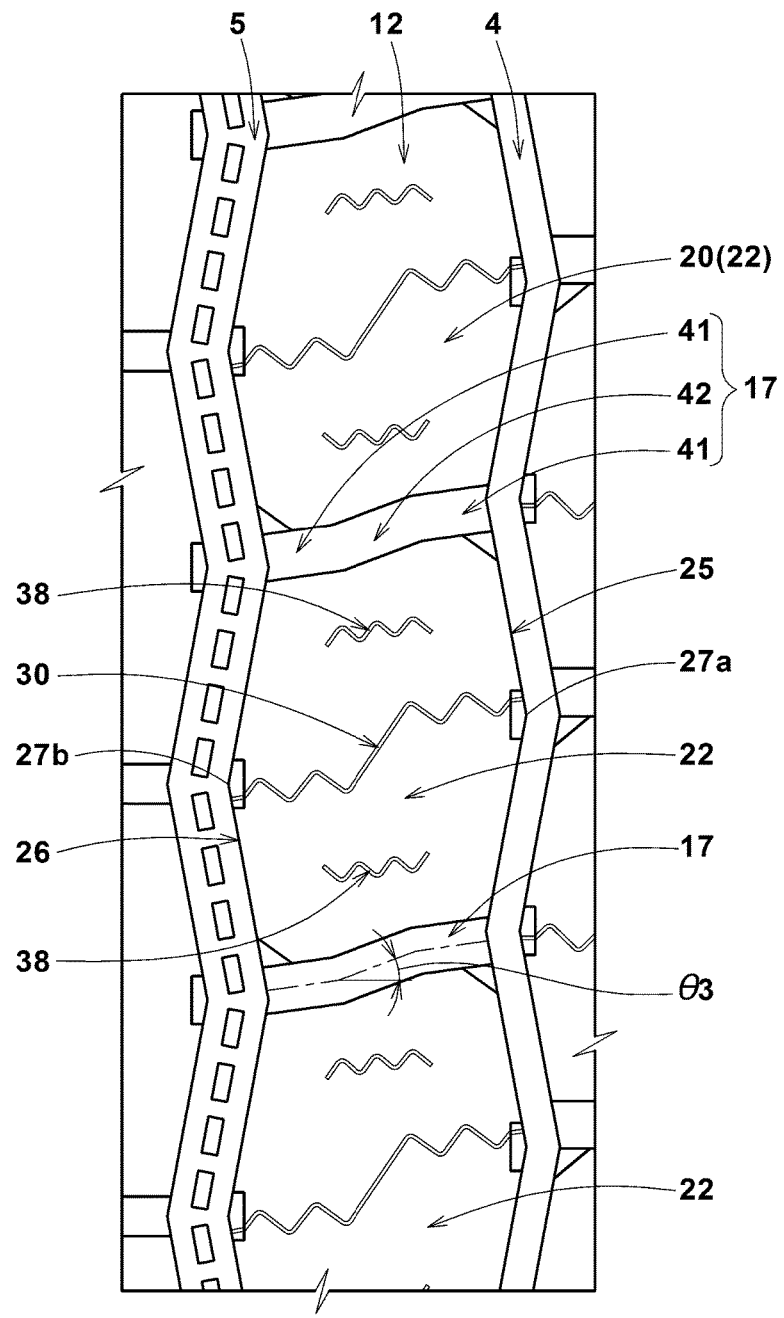
FIG. 5 is a closeup showing the middle land region in FIG. 1.

As shown in FIG. 5, each of the middle land regions 12 in this example is a row of the circumferentially arranged middle blocks 22. The middle blocks 22 are divided by the crown main grooves 4, the shoulder main grooves 5, and middle axial grooves 17 connecting therebetween.

The middle axial groove 17 in this example is inclined with respect to the tire axial direction at an angle θ3 of from 5 to 15 degrees, and has a bent point.

Preferably, the middle axial groove 17 in this example has two bent points and is composed of a pair of first axial groove portions 41 and a second axial groove portion 42 therebetween. The first axial groove portions 41 are respectively connected to the crown main groove 4 and the shoulder main groove 5. The second axial groove portion 42 inclined with respect to the tire axial direction at an angle more than those of the first axial groove portions 41. Thereby, during running in wet conditions, water in the first axial groove portions 41 is smoothly guided toward the main grooves to improve the wet performance.

In this embodiment, the middle block 22 has a similar configuration to the above described center block 21. That is, the middle block 22 has the block side walls 25 and 26, and is provided with the first sipe 30 and the second sipes 38. In the middle block 22 shown in FIG. 5 and the center block 21 shown in FIG. 4, the same reference numbers are used for the same components.

Figure 6:
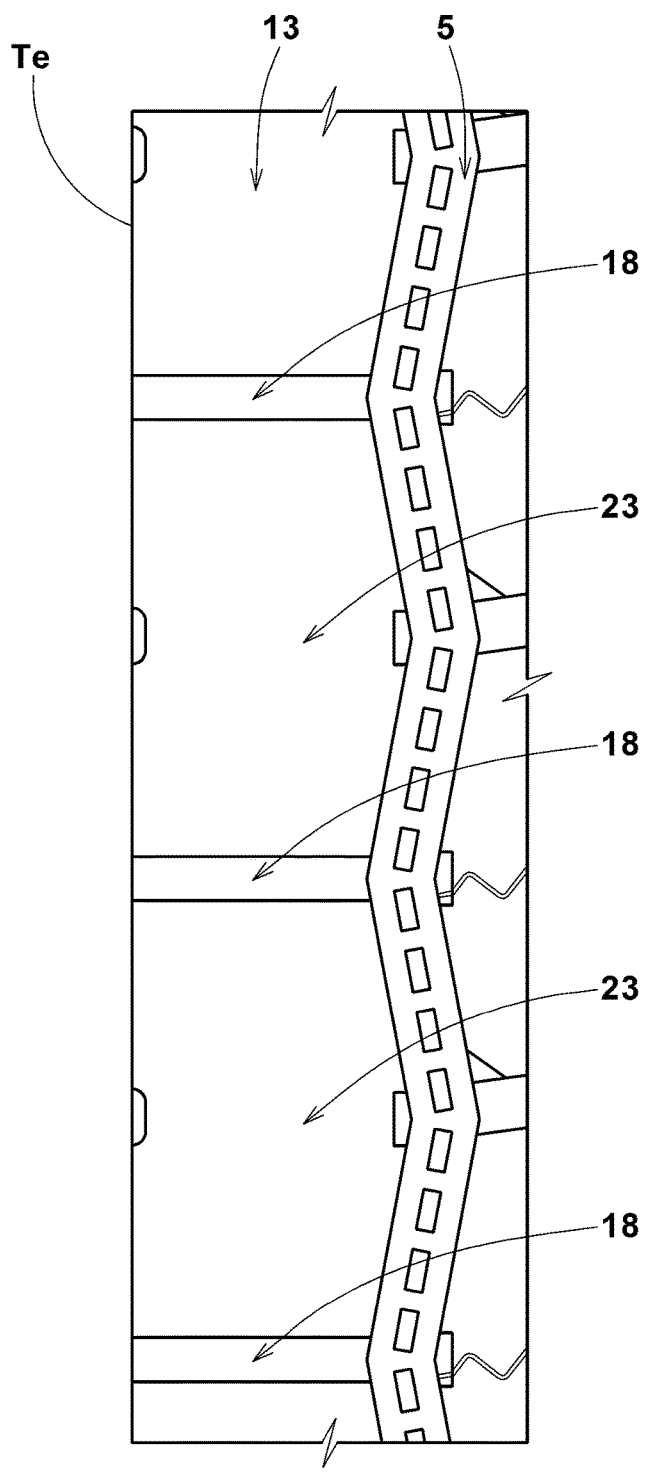
FIG. 6 is a closeup showing the shoulder land region in FIG. 1.

As shown in FIG. 6, in each shoulder land region 13 in this example, shoulder blocks 23 are arranged in the tire circumferential direction. The shoulder blocks 23 are divided by shoulder axial grooves 18 extending from the shoulder main groove 5 to the tread edge Te.

The shoulder axial grooves 18 in this example extend straight in parallel with the tire axial direction. Preferably, the depth of the shoulder axial groove 18 is in a range of from 0.05 to 0.25 times the depth of the shoulder main grooves 5.

Thus, as the tread portion is provided with the shoulder land regions 13 having higher rigidity, the load in the ground contacting parts of the center land region 11 and the middle land regions 12 (shown in FIG. 1) can be mitigated. Accordingly, the center land region 11 and the middle land regions 12 are further improved in the uneven wear resistance, The shoulder block 23 in this example has a tread having a substantially pentagonal shape. Preferably, the treads of the shoulder blocks 23 are provided with no sipe so that the shoulder blocks 23 can exert good durability.

While detailed description has been made of an especially preferable embodiment of the present invention, the present invention can be embodied in various forms without being limited to the illustrated embodiment Comparioson Tests Based on the tread pattern shown in FIG. 1, heavy duty pneumatic tires of size 11R 22.5 (wheel rim: 22.5×8.25) having specifications listed in Table 1 were experimentally manufactured.

The test tires were tested for the rolling resistance, wear resistance and uneven wear.

<Rolling Resistance Test>

Using a rolling resistance tester, each tire was measured for the rolling resistance under the following conditions.
tire pressure: 830 kPa
vertical tire load: 25.01 N
speed: 80 km/h The results are indicated in Table 1 by an index based on the comparative example 1 being 100, wherein the smaller the value, the better the rolling resistance.

<Wear Resistance Test>

Using the following test vehicle, the amount of wear of the center blocks was measured after traveling on a dry road for a predetermined distance.
test vehicle: 10 ton truck loaded with 50% of the load capacity on the front part of the loading space
wheels on which test tires were mounted: all tire pressure: 720 kPa The results are indicated in Table 1 by an index based on the amount of wear of the comparative example 1 being 100, wherein the smaller the value, the better the wear resistance.

<Uneven Wear Test>

Using the above-mentioned test vehicle, the vicinities of the second sipes were visually checked for whether uneven wear was caused or not after traveling on a dry road for a predetermined distance.

The results are shown in Table 1.

TABLE 1

| Tire | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| First sipe maximum depth d1/Main groove maximum depth d3 | 0.70 | 0.70 | 0.50 | 0.90 | 0.70 | 0.70 | 0.70 | 0.70 | 0.70 |
| Second sipe maximum depth d2/Main groove maximum depth d3 | 0.70 | 0.40 | 0.20 | 0.50 | 0.40 | 0.40 | 0.40 | 0.40 | 0.40 |
| Distance L5 from block side wall vertex to sipe end/Distance L4 from vertex to block end | 0.05 | 0.05 | 0.05 | 0.05 | 0.50 | 0.05 | 0.05 | 0.05 | 0.05 |
| Second sipe length L10/Block maximum axial length L2 | 0.34 | 0.34 | 0.34 | 0.34 | 0.34 | 0.30 | 0.40 | 0.34 | 0.34 |
| Second sipe amplitude A2/Block maximum circumferential length L1 | 0.05 | 0.05 | 0.05 | 0.05 | 0.05 | 0.05 | 0.05 | 0 | 0.15 |
| rolling resistance | 100 | 95 | 94 | 96 | 95 | 95 | 96 | 96 | 94 |
| wear resistance | 100 | 93 | 95 | 94 | 95 | 93 | 93 | 93 | 94 |
| uneven wear *1 | Y | N | N | N | N | N | N | N | N |

*1) Y: uneven wear occurred, N: not occurred

As shown in Table 1, it was confirmed that the pneumatic tires as embodiments were improved in the uneven wear resistance.

DESCRIPTION OF THE SIGNS 2 tread portion
3 main groove
20 block
30 first sipe
38 second sipe
d1 maximum depth of first sipe
d2 maximum depth of second sipe

The invention claimed is:

1. A pneumatic tire comprising
a tread portion provided with a plurality of blocks divided by a plurality of main grooves extending continuously in the tire circumferential direction, and a plurality of axial grooves connecting between the main grooves, wherein
the blocks include a siped block,
the siped block is provided with a first sipe extending in the tire axial direction across the block so as to subdivide the block into two regions, and only two second sipes disposed within the respective two regions subdivided by the first sipe,
the first sipe comprises
a first portion including one end in the tire axial direction of the first sipe,
a second portion including the other end in the tire axial direction of the first sipe, and
a third portion between the first portion and the second portion,
wherein
the third portion extends straight while inclining with respect to the tire axial direction,
the first portion has a wavy configuration extending in the tire axial direction from one end of the third portion while oscillating in the tire circumferential direction, and
the second portion has a wavy configuration extending in the tire axial direction from the other end of the third portion while oscillating in the tire circumferential direction,
the maximum depth of the first sipe is in a range of from 0.50 to 0.90 times the maximum depth of the main grooves,
each of the second sipes is a closed sipe having both ends closed, and has an axial length (L10) in a range from 0.30 to 0.40 times the maximum axial length (L2) of the siped block, and
the maximum depth of the second sipe is less than the maximum depth of the first sipe and in a range of from 0.20 to 0.50 times the maximum depth of the main grooves.

2. The pneumatic tire according to claim 1, wherein the axial length of the third portion is less than the axial length of the second sipe.

3. The pneumatic tire according to claim 1, wherein the siped block has a first block side wall and a second block side wall respectively extending along the main grooves on both sides thereof, in the top view of the siped block, the first block side wall and the second block side wall are substantially V-shaped to have a vertex protruding outwardly of the block, and
said one end of the first sipe is positioned on one side in the tire circumferential direction of the vertex of the first block side wall, whereas said other end of the first sipe is positioned on the other side in the tire circumferential direction of the vertex of the second block side wall.

4. The pneumatic tire according to claim 3, wherein the distance in the tire circumferential direction from the vertex of the first block side wall to said one end of the first sipe is in a range of from 0.05 to 0.20 times the distance in the tire circumferential direction from the vertex of the first block side wall to an end of the first block side wall on said one side in the tire circumferential direction.

5. The pneumatic tire according to claim 1, wherein
the main grooves include a pair of crown main grooves disposed one on each side of the tire equator, and a pair of shoulder main grooves disposed axially outside the respective crown main grooves,
the axial grooves include center axial grooves connecting between a pair of the crown main grooves, middle axial grooves connecting between the crown main grooves and the shoulder main grooves, and shoulder axial grooves extending from the shoulder main grooves to the tire tread edges,
the center axial grooves and the shoulder axial grooves extend straight in parallel with the tire axial direction, and
the middle axial grooves incline with respect to the tire axial direction and each have a bent part.

6. The pneumatic tire according to claim 5, wherein the depth of the shoulder axial grooves is in a range of from 0.05 to 0.25 times the depth of the shoulder main grooves.

7. The pneumatic tire according to claim 1, wherein the ratio (d2/d1) of said maximum depth (d2) of the second sipes to said maximum depth (d1) of the first sipes is in a range from 0.30 to 0.50.

8. The pneumatic tire according to claim 1, wherein each of the second sipes has a wavy configuration extending in the tire axial direction while oscillating in the tire circumferential direction to have a peak-to-peak amplitude (A2) measured in the tire circumferential direction which is in a range from 0.03 to 0.15 times the maximum length (L1) in the tire circumferential direction of the siped block.

9. The pneumatic tire according to claim 8, wherein the first portion and the second portion each have a peak-to-peak amplitude (A1) measured in the tire circumferential direction which is in a range from 1.30 times to 1.50 times said peak-to-peak amplitude (A2) of the second sipes.

10. The pneumatic tire according to claim 1, wherein the third portion of said first sipe is straight and inclined at an angle (θ2) of from 40 to 60 degrees with respect to the tire axial direction.

11. The pneumatic tire according to claim 1, wherein the axial length (L3) of the third portion of said first sipe is in a range from 0.70 times to 0.85 times said axial length (L10) of the second sipes.

* * * * *